United States Patent
Sone et al.

(10) Patent No.: US 9,963,093 B2
(45) Date of Patent: May 8, 2018

(54) WIRE HARNESS ATTACHMENT STRUCTURE AND WIRING UNIT

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kosuke Sone, Mie (JP); Tetsuji Tanaka, Mie (JP); Osamu Nakayama, Mie (JP); Tomohide Maki, Mie (JP)

(73) Assignees: AutoNetworks Technologies, Ltd., Yokkaichi (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/529,665

(22) PCT Filed: Nov. 12, 2015

(86) PCT No.: PCT/JP2015/081805
§ 371 (c)(1),
(2) Date: May 25, 2017

(87) PCT Pub. No.: WO2016/088525
PCT Pub. Date: Jun. 9, 2016

(65) Prior Publication Data
US 2017/0327061 A1    Nov. 16, 2017

(30) Foreign Application Priority Data

Dec. 3, 2014 (JP) ................... 2014-244632

(51) Int. Cl.
*B60R 16/023* (2006.01)
*B60R 16/02* (2006.01)
*H01R 24/00* (2011.01)

(52) U.S. Cl.
CPC ...... *B60R 16/0231* (2013.01); *B60R 16/0207* (2013.01); *H01R 24/005* (2013.01); *H01R 2201/26* (2013.01)

(58) Field of Classification Search
CPC .... H01R 2201/26; H01R 4/64; H01R 13/506; H01R 13/514; H01R 13/6273;
(Continued)

(56) References Cited

U.S. PATENT DOCUMENTS 5,332,866 A * 7/1994 Sawamura ........... H02G 3/0608
138/166
5,597,980 A * 1/1997 Weber ................. H02G 3/0418
123/143 C
(Continued)

FOREIGN PATENT DOCUMENTS

JP         S6284558 A     4/1987
JP         2004166461 A   6/2004
(Continued)

OTHER PUBLICATIONS

International Preliminary Report on Patentability for Application No. PCT/JP2015/081805 dated Nov. 12, 2015, 8 pages.
(Continued)

*Primary Examiner* — Truc Nguyen
(74) *Attorney, Agent, or Firm* — Reising Ethington, P.C.

(57) ABSTRACT

A wire harness attachment structure and a wiring unit that are capable of reducing the amount of work that is needed when attaching a wire harness. The wire harness attachment structure includes: a plate on which a wire harness is to be mounted; and a cover that covers a portion of the wire
(Continued)

harness and is fixed to the plate. A locking portion that is provided for the cover is configured to be orientated to face, and to be inserted into, a lock receiving portion that is provided for the plate, and thus the locking portion is locked to the lock receiving portion, and the cover is fixed to the plate.

5 Claims, 8 Drawing Sheets

(58) Field of Classification Search
CPC ........ H01R 31/08; H01R 43/28; H01R 9/223; H01R 12/515; H01R 12/714; H01R 12/79; H01R 13/24; H01R 13/2428; H01R 13/4223
See application file for complete search history.

(56) References Cited

U.S. PATENT DOCUMENTS

| | | | | |
|---|---|---|---|---|
| 6,070,931 | A * | 6/2000 | Yamaguchi | B60R 16/0215 296/146.7 |
| 6,126,458 | A * | 10/2000 | Gregory, II | H01R 13/6215 439/364 |
| 6,435,891 | B1 * | 8/2002 | Beck, Jr. | H01R 13/6315 439/248 |
| 2004/0017648 | A1 * | 1/2004 | Tsubaki | B60R 16/0215 361/601 |
| 2006/0172612 | A1 * | 8/2006 | Wasalaski | H01R 13/447 439/752 |
| 2014/0027147 | A1 * | 1/2014 | Yamamoto | H02G 3/0462 174/68.3 |
| 2015/0048221 | A1 * | 2/2015 | Doushita | H02G 3/04 248/71 |
| 2016/0001717 | A1 | 1/2016 | Kawashima et al. | |
| 2016/0156165 | A1 * | 6/2016 | Katou | H01B 7/0045 174/72 A |

FOREIGN PATENT DOCUMENTS

JP      2012239316 A    12/2012
JP      2014199071 A    10/2014

OTHER PUBLICATIONS

International Search Report for Application No. PCT/JP2015/081805 dated Feb. 9, 2016, 4 pages.

* cited by examiner

*Figure 8*
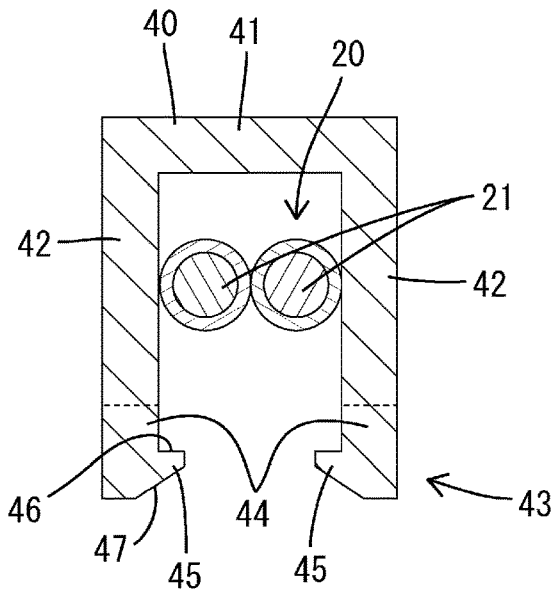
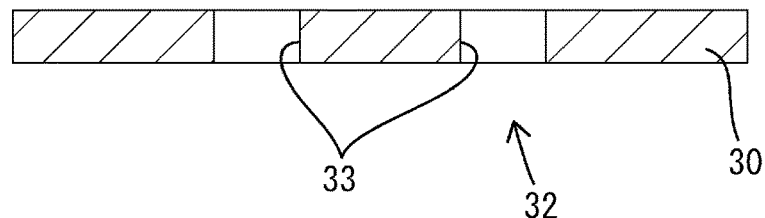
*Figure 9*
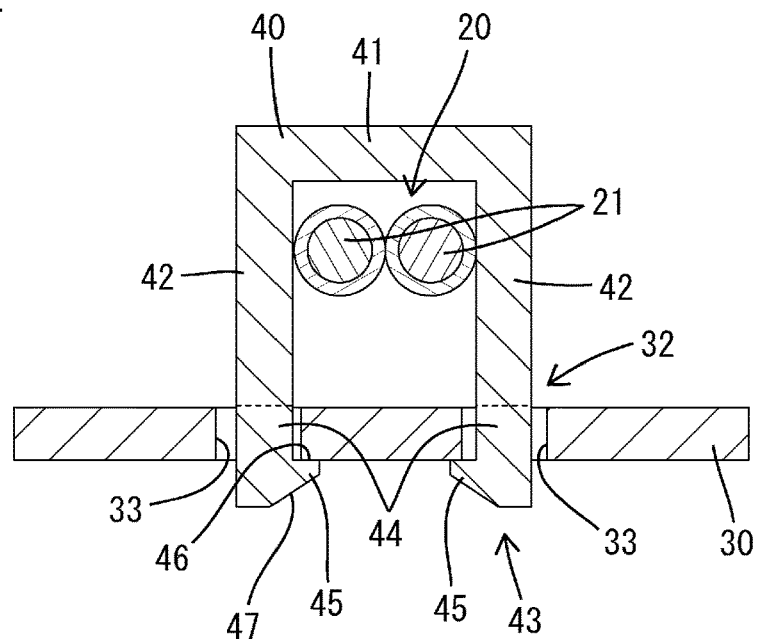

WIRE HARNESS ATTACHMENT STRUCTURE AND WIRING UNIT

CROSS REFERENCE TO RELATED APPLICATIONS

This application claims the priority of Japanese patent application JP2014-244632 filed on Dec. 3, 2014, the entire contents of which are incorporated herein.

TECHNICAL FIELD

The present invention relates to a wire harness attachment structure and a wiring unit.

BACKGROUND ART

There are conventionally known wiring units in which a wire harness is fixed to a plate. For example, in the wiring unit that is disclosed in Patent Document 1 (JP 2014-199071A) below, a wire harness is mounted on a plate and is fixed to the plate at a plurality of positions using cable ties. A cable tie is passed through a pair of pass-through holes that are formed penetrating the plate and is locked to the back surface side of the plate, to tie up the wire harness on the top surface side of the plate.

SUMMARY

However, with the above-described configuration, in order to attach the wire harness to the plate, it is necessary to perform the task of passing cable ties through pass-through holes at fixing positions, and tying up the wire harness. Therefore, there is a problem in that a large amount of work is needed.

The present design has been completed based on the above-described situation, and aims to provide a wire harness attachment structure and a wiring unit that are capable of reducing the amount of work that is needed when attaching a wire harness.

A wire harness attachment structure according to the present design is a wire harness attachment structure that includes: a plate on which a wire harness is to be mounted; and a cover that covers a portion of the wire harness and is fixed to the plate, wherein a locking portion that is provided for the cover is configured to be orientated to face, and to be inserted into, a lock receiving portion that is provided for the plate, and thus the locking portion is locked to the lock receiving portion, and the cover is fixed to the plate, the cover includes a plurality of covers that have different shapes, and the plurality of covers include: a cover that has an I shape in plan view and is provided for a straight portion of the wire harness; and a cover that has an L shape in plan view and is provided for a bent portion or a branching portion of the wire harness; and a cover that is provided with an edge cover portion that protrudes toward the plate, extends along an end edge of the plate, and covers the end edge of the plate.

A wiring unit according to the present design includes: a wire harness that is mounted on the plate; and the wire harness attachment structure.

According to the present design, the plate and the cover are pressed against each other, and thus the cover is fixed to the plate and the wire harness is attached to the plate. Therefore, it is possible to reduce the amount of work that is needed when attaching the wire harness, compared to cases in which a cable tie or the like is used.

BRIEF DESCRIPTION OF DRAWINGS

FIG. 8 is a cross-sectional view showing a locking portion and a lock receiving portion in a state before the cover has been fixed to the plate.

FIG. 9 is a cross-sectional view showing the locking portion and the lock receiving portion in a state in which the cover has been fixed to the plate.

DESCRIPTION OF EMBODIMENTS

The following describes preferred embodiments.

In the wire harness attachment structure according to the present design, the cover may include a plurality of covers that have different shapes. With such a configuration, a cover can be selected out of the plurality of covers as appropriate according to a mode in which the wire harness is to be mounted.

Also, in the wire harness attachment structure according to the present design, the lock receiving portion of the plate may be provided in a plurality, and any covers that are selected out of the plurality of covers as appropriate can be fixed to the plate. With such a configuration, it is possible to change the mode in which the wire harness is to be mounted, by fixing covers selected out of the plurality of covers as appropriate, to the plate. Therefore, there is no need to provide a dedicated cover for each of the wiring units of different types, and it is relatively easy to support wiring units of many types.

Also, in the wire harness attachment structure according to the present design, the cover may be provided with an edge cover portion that covers an end edge of the plate when the cover is fixed to the plate. With such a configuration, electrical wires are not brought into contact with an end edge of the plate, and therefore it is possible to prevent coatings of the electrical wires from being brought into contact with an end edge of the plate and being damaged.

Also, in the wire harness attachment structure according to the present design, the cover may be provided with a connector holding portion that holds a connector that is provided for the wire harness. With such a configuration, the connector is fixed to the cover, and therefore it is possible to prevent the connector from swinging and the electrical wires from being damaged by coming into contact with an end edge of the plate.

Also, the wiring unit according to the present design may be attached to an automatic transmission.

The following describes a specific embodiment in detail with reference to FIGS. 1 to 9.

Figure 1:
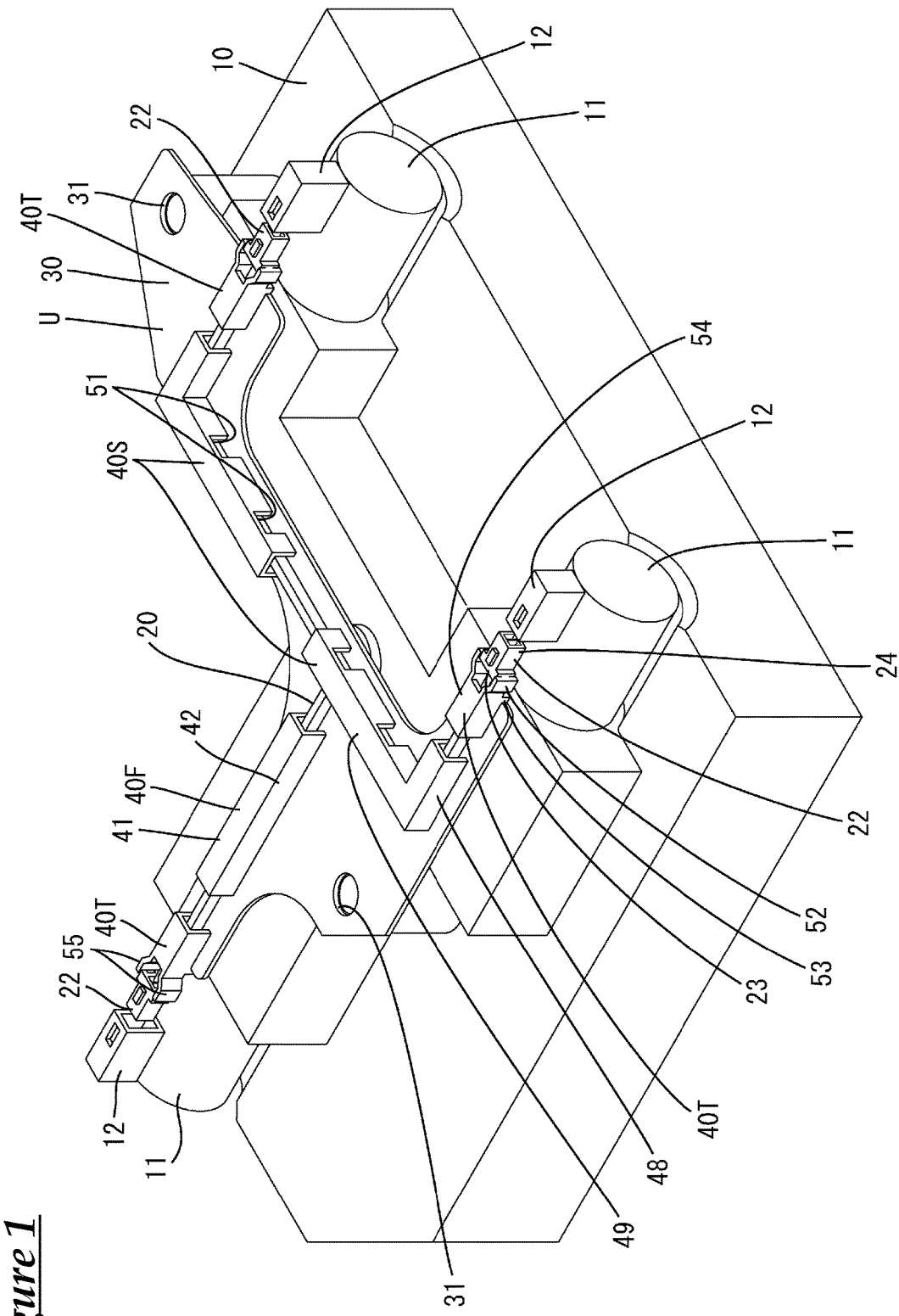
FIG. 1 is a perspective view showing a wiring unit according to an embodiment, which is in a state of being attached to a device.

As shown in FIG. 1, a wiring unit U according to the present embodiment is attached to a device 10 (a control unit 10 for an automatic transmission in the present embodiment) that is mounted on a vehicle, and performs some of the control related to transmission operations. The device 10 includes a plurality of solenoid valves 11 (three valves in the present embodiment), and device side connectors 12 are respectively provided on upper parts of the solenoid valves 11. In the following description, the upper side and the lower side of FIG. 1 respectively coincide with the upper side and the lower side of each constituent member.

The wiring unit U includes a wire harness 20, a plate 30 on which the wire harness 20 is mounted, and covers 40 that cover portions of the wire harness 20 and are fixed to the plate 30.

Figure 2:
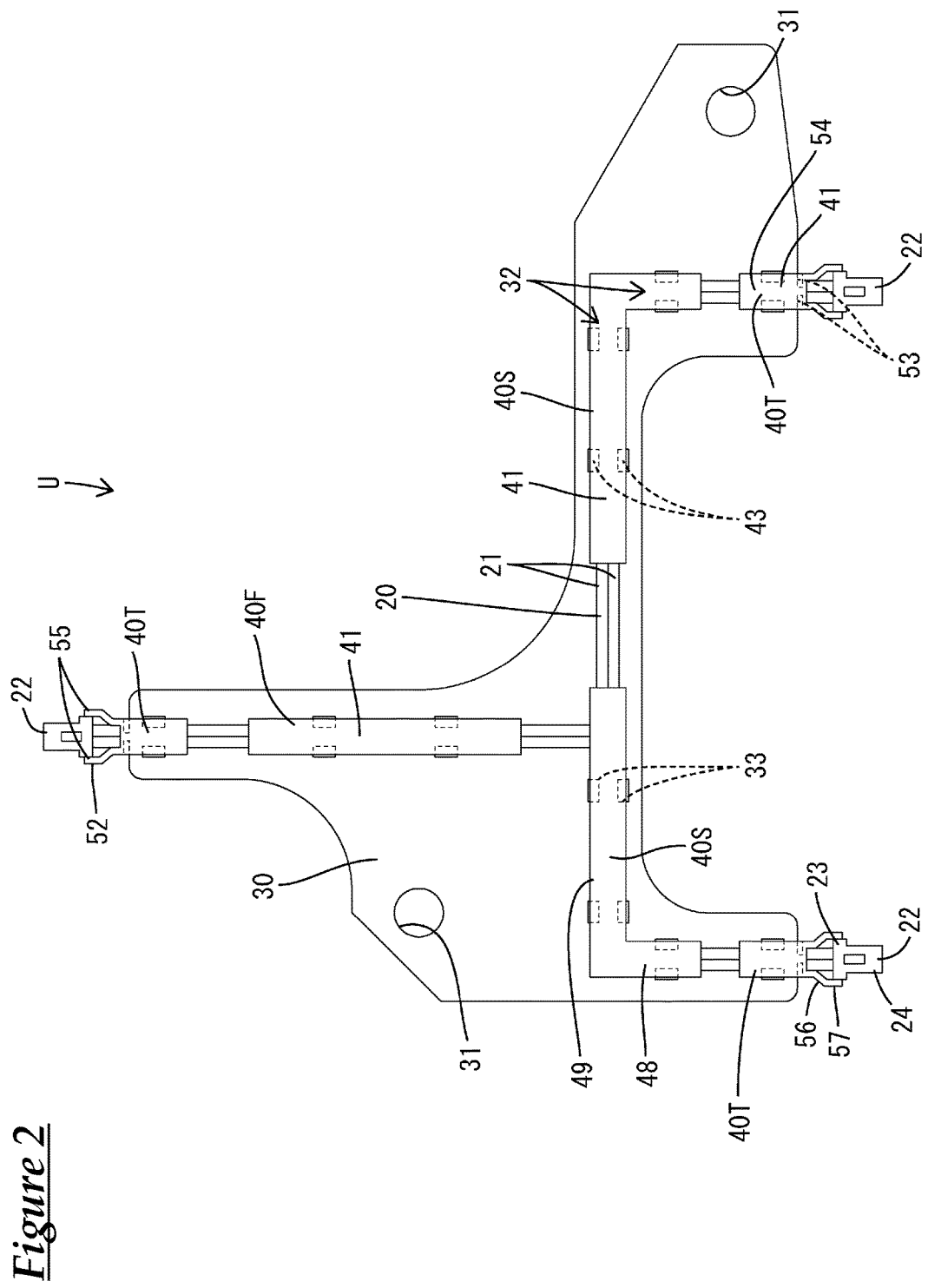
FIG. 2 is a plan view showing the wiring unit.

As shown in FIG. 2, the wire harness 20 includes a plurality of electrical wires 21, and a plurality of electrical wire side connectors 22 that are connected to terminal portions of the electrical wires 21 and are thus connected to the device side connectors 12.

Figure 4:
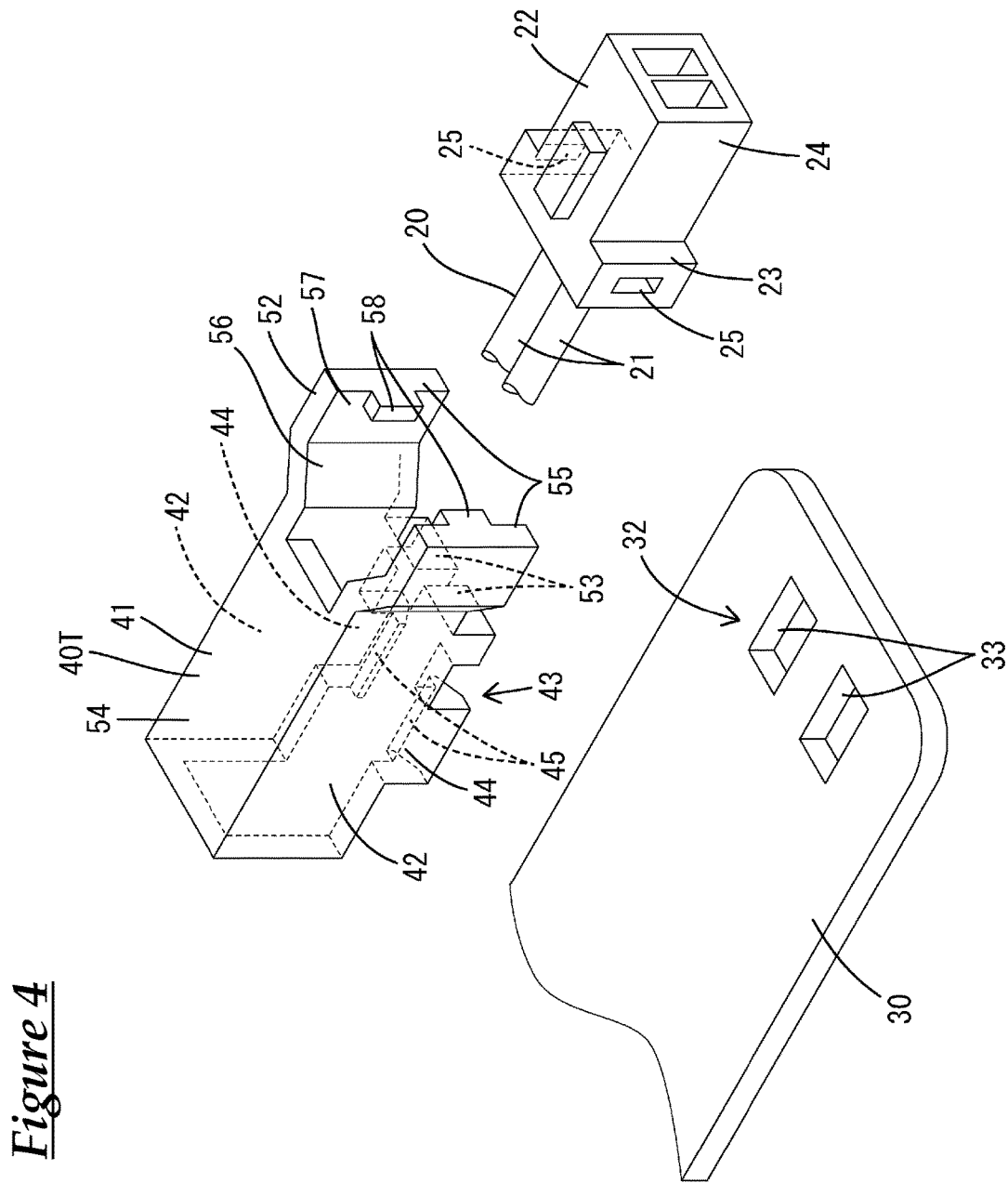
FIG. 4 is a perspective view showing: a cover that includes a connector holding portion; an electrical wire side connector; and a portion of a plate.
Figure 5:
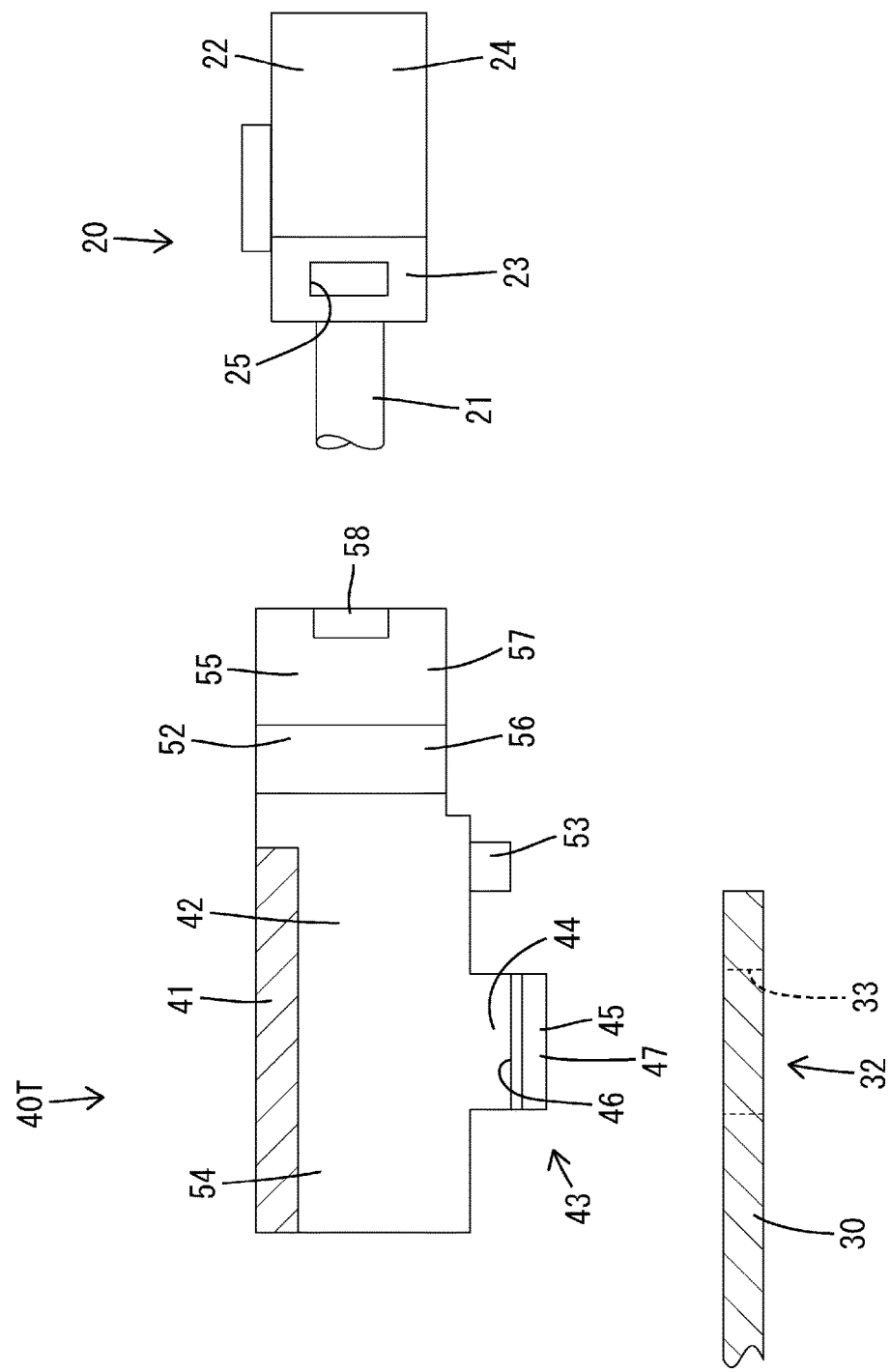
FIG. 5 is a cross-sectional view showing: the cover that includes the connector holding portion; the electrical wire side connector; and a portion of the plate.
Figure 6:
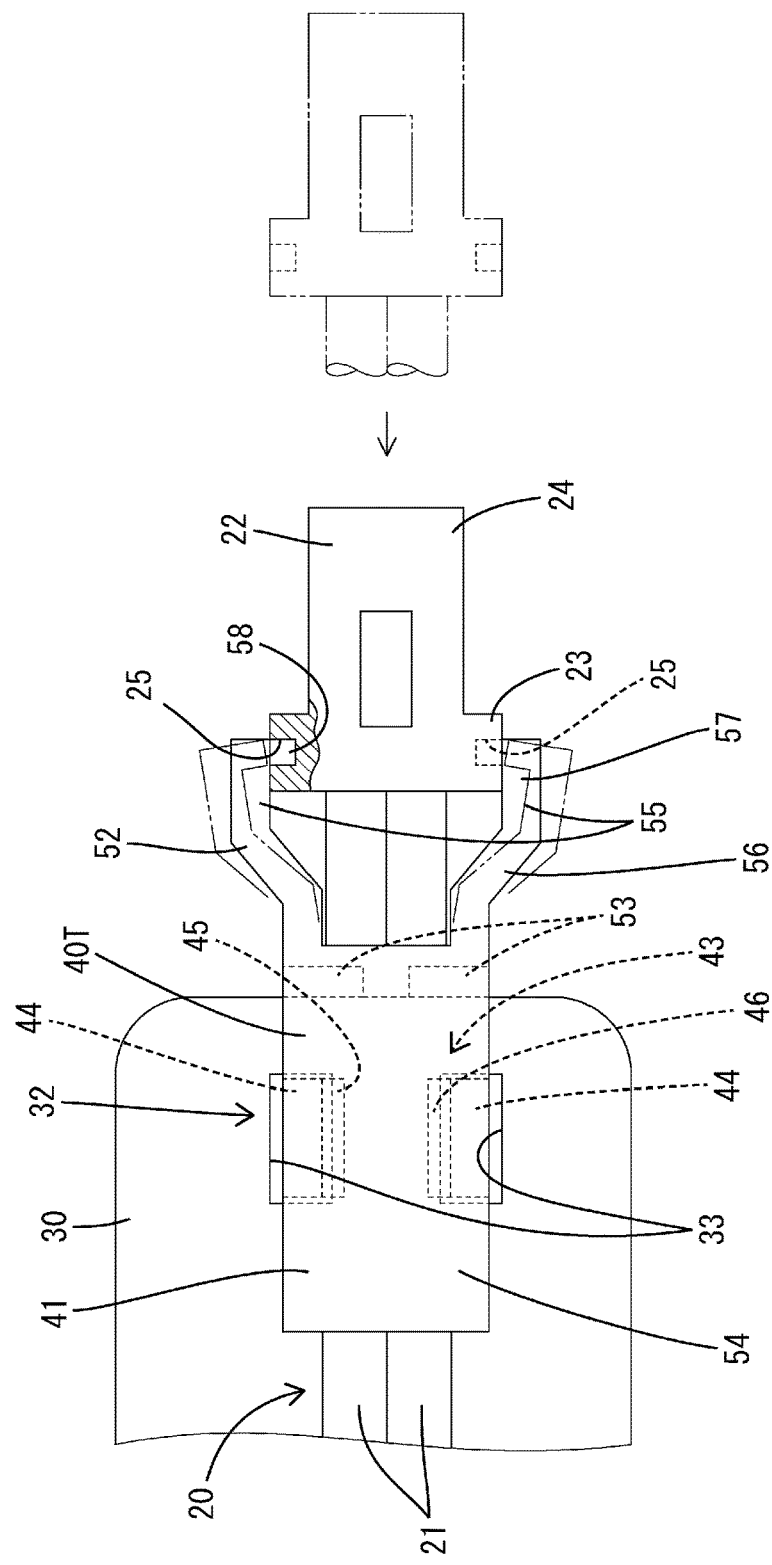
FIG. 6 is a partially cutaway plan view showing a situation in which the electrical wire side connector is held by the connector holding portion of the cover.

As shown in FIGS. 4 and 6, a rear end portion of each electrical wire side connector 22 is provided with a holding target portion 23 that is to be held by a cover 40. The holding target portion 23 has a shape that protrudes further in both the left and right directions than a front portion (a fitting portion 24 that is to be fitted to a device side connector 12) of the electrical wire side connector 22.

The holding target portion 23 is provided with locking recessed portions 25 to which locking protruding portions 58 that are provided for the cover 40 can be fitted. The locking recessed portions 25 are formed so as to be recessed in the left and right surfaces (protruding end surfaces) of the holding target portion 23, and each have a rectangular shape that is elongated in the top-bottom direction.

The plate 30 is formed from a plate member that is made of metal, and bolt insertion holes 31 are formed penetrating the plate 30, respectively at a plurality of positions. The wiring unit U is fixed to the device 10 using bolts or the like (not shown).

The plate 30 is provided with a plurality of lock receiving portions 32 to which the covers 40 of a plurality types, which will be described later, can be selectively locked. As shown in FIG. 4, each lock receiving portion 32 includes a pair of through holes 33 that are formed penetrating the plate 30. Each through hole 33 has a rectangular shape (that is slightly elongated in a direction in which the wire harness 20 is routed) in plan view. The pair of through holes 33 are provided at a predetermined interval that matches the interval between a pair of elastic leg portions 44, which will be described later.

As shown in FIG. 1, each cover 40 is provided with a top wall 41 that covers a top side (the side that is opposite the plate 30) of the wire harness 20, and a pair of side walls 42 that cover both the left and right sides of the wire harness 20. The top wall 41 has a constant width that can cover the wire harness 20. The pair of side walls 42 extend downward at substantially right angles from both side edges of the top wall 41. Each cover 40 has a substantially U-shaped cross section that is open in one direction (downward).

As shown in FIGS. 8 and 9, each cover 40 is provided with locking portions 43 that are to be orientated so as to face, and are to be fitted into, lock receiving portions 32 that are provided in the plate 30, and the locking portions 43 are thus locked to the lock receiving portions 32. Each locking portion 43 includes a pair of elastic leg portions 44 that protrude downward from the lower ends of the pair of side walls 42, and claw portions 45 that are provided on the lower ends (edges) of the elastic leg portions 44. The pair of elastic leg portions 44 are elastically deformable in the direction in which the interval therebetween increases. The claws 45 protrude inward from the pair of elastic leg portions 44, and the upper surfaces thereof are locking surfaces 46 that are to be locked to the back surface (the lower surface) of the plate 30. The lower surfaces of the claw portions 45 are guide surfaces 47 that are inclined so as to guide the claw portions 45 when the claw portions 45 are inserted into the through holes 33.

The locking portions 43 elastically deform due to a pressing operation being performed, and then elastically return to the original shape and are locked to the lock receiving portion 32. Specifically, when the locking portion 43 is pressed into the lock receiving portion 32, the guide surfaces 47 of the claw portions 45 are brought into contact with edge portions of the through holes 33, the elastic leg portions 44 are elastically bent outward, and the claw portions 45 pass through the through holes 33. Then, the elastic leg portions 44 elastically return inward, and the locking surfaces 46 are locked to the back surface of the plate 30. Consequently, the cover 40 is fixed to the plate 30. At this time, the lower ends of the side walls 42 are brought closer to or into contact with the top surface of the plate 30.

Figure 3:
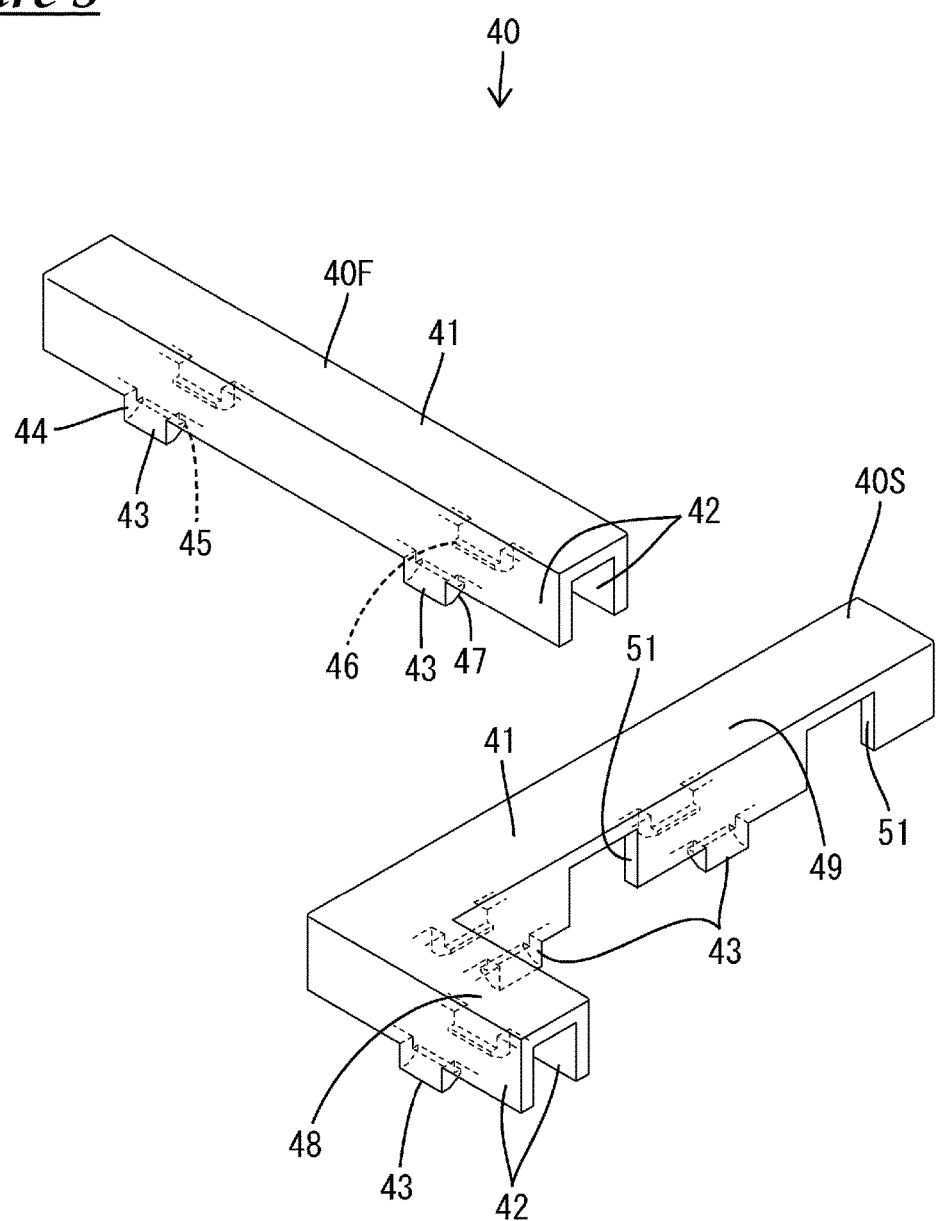
FIG. 3 is a perspective view showing covers of two types.

As shown in FIGS. 3 and 4, the covers 40 include covers 40 of a plurality of types (three types in the present embodiment) that have different shapes. The covers 40 of the three types are each provided in a plurality (hereinafter referred to as first covers 40F, second covers 40S, and third covers 40T).

Each first cover 40F has an I shape in plan view, and is elongated in one direction. The top wall 41 and the side walls 42 of each first cover 40F are continuous along the entire length from one end to the other end in the longitudinal direction, and a portion of the wire harness 20 that is covered by the first cover 40F is completely surrounded by the plate 30 and the first cover 40F from four directions. Each first cover 40F is provided with a plurality of locking portions 43 (one portion on one end side and one portion on the other end side in the longitudinal direction in the present embodiment).

The second covers 40S are to be provided at bent portions and branching portions of the wire harness 20. Each second cover 40S has an L shape in plan view. One portion and the other portion of each second cover 40S, between which a corner portion that form a substantially right angle is interposed, are formed such that the one portion is longer than the other portion. Hereinafter the shorter portion and the longer portion of each second cover 40S are respectively referred to as a first edge portion 48 and a second edge portion 49.

The top wall 41 of each second cover 40S is continuous along the entire length from one end to the other end in the longitudinal direction. The side walls 42 of each second cover 40S are continuously provided in the first edge portion 48 and are discontinuously provided in the second edge portion 49.

In the second edge portion 49, openings 51 that are open in the left-right direction (the width direction) of the second cover 40S are respectively provided at a plurality of positions (two positions in the present embodiment) in the side walls 42 that are discontinuously provided. The openings 51 allow the wire harness 20 that is routed in the second edge portion 49 of the second cover 40S to be led out of an intermediate portion of the second edge portion 49 in the longitudinal direction at substantially right angles. Also, since a plurality of openings 51 are provided, it is possible to change positions at which the wire harness 20 is to be bent within the second cover 40S as appropriate. Furthermore, since the openings 51 are provided on both sides of the second cover 40S in the width direction, it is possible to appropriately select the directions in which the wire harness 20 is to be bent.

Each second cover 40S is provided with a plurality of locking portions 43 (one portion in the first edge portion 48 and a pair of portions in the second edge portion 49 in the present embodiment). Note that the second covers 40S of two types are provided in the present embodiment (see FIG. 2), which are bent in directions that are different from each other by 90 degrees.

As shown in FIG. 1, the third covers 40T are fixed to positions on a peripheral portion of the plate 30 that correspond to the solenoid valves 11 of the device 10.

Figure 7:
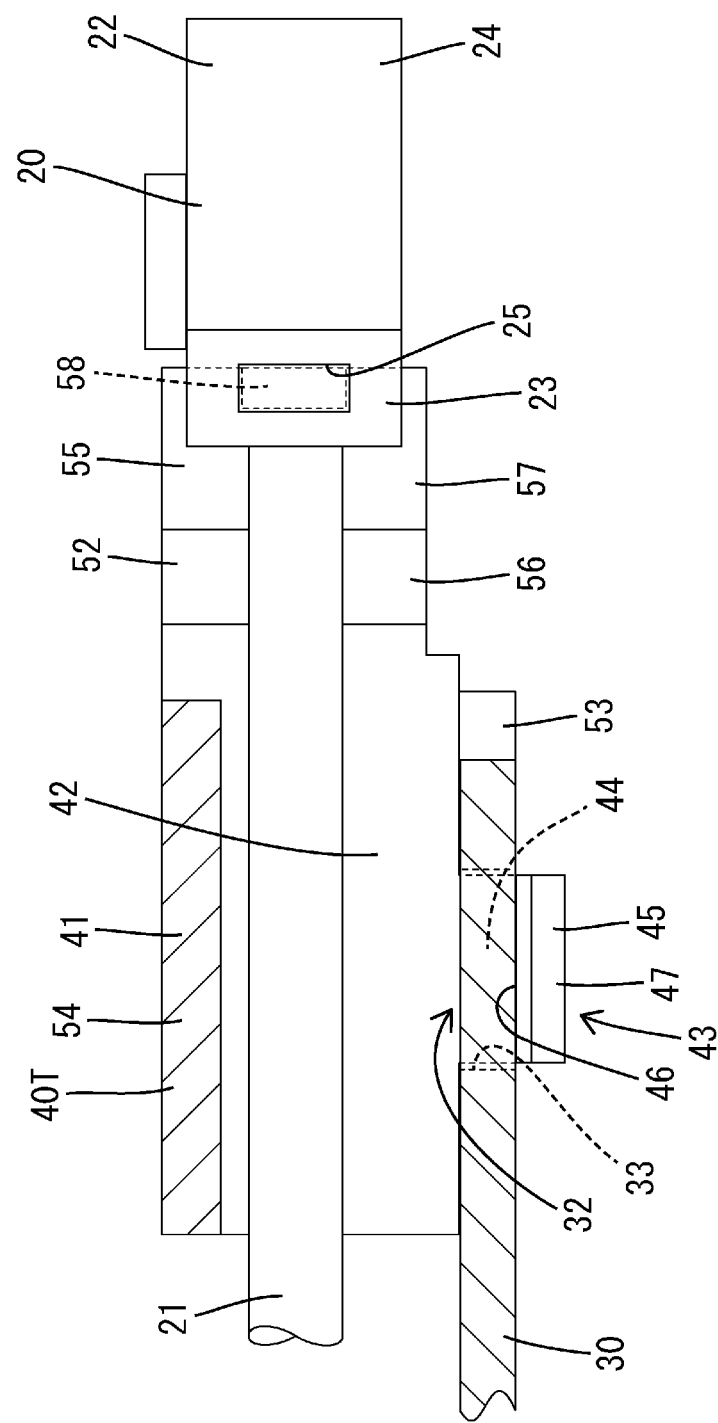
FIG. 7 is a cross-sectional view showing a state in which the electrical wire side connector is held by the cover that is fixed to the plate.

As shown in FIG. 7, each third cover 40T is provided with edge cover portions 53 that cover end edges of the plate 30 when the third cover 40T is fixed to the plate 30. The edge cover portions 53 protrude downward from the lower ends of the two side walls 42 of the third cover 40T, and, as shown in FIG. 6, protrude toward the center in the width direction so as to extend along the end edges of the plate 30. Note that a small gap (which is smaller than the outer diameter of the electrical wires 21 of the wire harness 20) is provided between the pair of edge cover portions 53.

Also, as shown in FIG. 6, each third cover 40T is provided with a connector holding portion 52 that holds an electrical wire side connector 22. The connector holding portion 52 is provided so as to protrude in one direction from one end side, in the longitudinal direction, of a cover main portion 54 that includes the top wall 41 and the pair of side walls 42. In the state in which the third cover 40T is fixed to the plate 30, the entire body of the connector holding portion 52 is located so as to protrude to the outside of the plate 30.

The connector holding portion 52 includes a pair of clamp portions 55 that clamp and hold the electrical wire side connector 22 in the width direction (the left-right direction). The pair of clamp portions 55 protrude in one direction from the pair of side walls 42 like cantilevers, and are elastically deformable in the direction in which the interval therebetween increases. The pair of clamp portions 55 include inclined portions 56 that are inclined obliquely outward from the cover main portion 54, and parallel portions 57 that extend from edge portions of the inclined portions 56 and are substantially parallel with each other. Note that the height of the clamp portions 55 is substantially equal to the height of the main portion of the cover 40 (the height of the side walls 42).

The edge portions (the parallel portions 57) of the pair of clamp portions 55 are provided with the locking protruding portions 58 that can be fitted into the locking recessed portions 25 of the electrical wire side connector 22. The locking protruding portions 58 have a block shape and protrude inward from substantially central portions of the clamp portions 55 in the height direction thereof.

Note that the cover main portion 54 of each third cover 40T is provided with one locking portion 43.

The width of the top wall 41 and the height of the side walls 42 of the first covers 40F, the second covers 40S, and the third covers 40T are substantially equal. Also, the locking portions 43 of the first covers 40F, the second covers 40S, and the third covers 40T have a substantially same shape.

Next, an example of the task of attaching the wire harness 20 to the plate 30 will be described.

First, when the wire harness 20 is to be assembled, all of the covers 40 are attached to predetermined positions on an assembly board. In the present embodiment, as shown in FIG. 2, one first cover 40F, two second covers 40S, and three third covers 40T are respectively attached to predetermined positions. At this time, the wire harness 20 is mounted inside the covers 40 (between each pair of side walls 42), and the respective top walls 41 of the covers 40 are brought into contact with the assembly board such that the openings of the covers 40 face the near side, and then the covers 40 are fixed to the assembly board.

Then, the electrical wire side connectors 22 are held using the third covers 40T (see FIG. 4). In order to hold the electrical wire side connectors 22 using the connector holding portions 52, the electrical wire side connectors 22 are moved rearward from positions that are forward of the connector holding portions 52. At this time, the electrical wires 21 to which the electrical wire side connectors 22 are to be connected may be pulled rearward, or alternatively, the fitting portion 24 side of the electrical wire side connectors 22 may be pushed rearward. Consequently, the holding target portions 23 of the electrical wire side connectors 22 are brought into contact with the locking protruding portions 58 so that the pairs of the clamp portions 55 elastically deform outward. Thus, the locking protruding portions 58 are fitted into the locking recessed portions 25 of the holding target portions 23, and simultaneously, the pairs of the clamp portions 55 elastically return inward, and the electrical wire side connectors 22 are held by the connector holding portions 52. The holding target portion 23 of each electrical wire side connector 22 that is held by a connector holding portion 52 is located between a pair of clamp portions 55, and the fitting portion 24 is located so as to entirely protrude outward (forward) from the connector holding portion 52.

Subsequently, the covers 40 are fixed to the plate 30. The lock receiving portions 32 of the plate 30 and the locking portions 43 of the covers 40 are positioned so as to face each other at predetermined positions, and the plate 30 is pressed against the assembly board (toward the wire harness 20). Consequently, the locking portions 43 of all of the covers 40 are locked to the lock receiving portions 32 of the plate 30, and thus the covers 40 are fixed to the plate 30 all at once.

Thus, the task of attaching the wire harness 20 to the plate 30 is complete.

Next, the actions and effects of the embodiment that has the above-described configuration will be described.

The wiring unit U according to the present embodiment includes: the plate 30 on which the wire harness 20 is to be mounted; and the covers 40 that cover portions of the wire harness 20 and are fixed to the plate 30. The locking portions 43 that are provided on the covers 40 are configured to be orientated to face, and to be inserted into, the lock receiving portions 32 that are provided in the plate 30, and thus the locking portions 43 are locked to the lock receiving portions 32 and the covers 40 are fixed to the plate 30. With this configuration, the plate 30 and the covers 40 are pressed against each other, and thus the covers 40 are fixed to the plate 30 and the wire harness 20 is attached to the plate 30. Therefore, it is possible to reduce the amount of work that is needed when attaching the wire harness 20, compared to cases in which a cable tie or the like is used.

Also, the covers 40 include a plurality of covers 40 that have different shapes. With this configuration, a cover 40 can be selected out of the plurality of covers 40 as appropriate according to a mode in which the wire harness 20 is to be mounted.

Also, the plate 30 is provided with a plurality of lock receiving portions 32, and any covers 40 that are selected out of the plurality of covers 40 as appropriate can be fixed to the plate 30. With this configuration, it is possible to change the mode in which the wire harness 20 is to be mounted, by fixing covers 40 that are selected out of the plurality of covers 40 as appropriate, to the plate 30. Therefore, there is no need to provide a dedicated cover for each of the wiring units of different types, and it is relatively easy to support wiring units of many types.

Also, each third cover 40T is provided with the edge cover portion 53 that covers an end edge of the plate 30 when the third cover 40T is fixed to the plate 30. With this configuration, the electrical wires 21 are not brought into contact with an end edge of the plate 30, and therefore it is possible to prevent coatings of the electrical wires 21 from being brought into contact with an end edge of the plate 30 and being damaged.

Also, each third cover 40T is provided with the connector holding portion 52 that holds an electrical wire side connector 22 that is provided for the wire harness 20. With this configuration, the electrical wire side connectors 22 are fixed to the third covers 40T, and it is possible to prevent the electrical wire side connectors 22 from swinging and the electrical wires 21 from being damaged by coming into contact with an end edge of the plate 30.

Other Embodiments

The present invention is not limited to the embodiment that has been described above with reference to the drawings, and, for example, the following embodiments are also included in the technical scope of the present invention.

Although the plate 30 in the above-described embodiment is made of metal, the material of the plate may be freely changed.

Although each third cover 40T in the above-described embodiment is provided with the edge cover portions 53 and the connector holding portion 52, this is not essential, and it is possible that either one of them is provided.

Although the above-described embodiment illustrates a method in which the plate 30 is pressed against the covers 40 on the assembly board and the covers 40 are fixed to the plate 30 all at once, this is not essential, and the covers may be fixed to the plate one by one.

Although the locking portions 43 in the above-described embodiment elastically deform due to the pressing operation, and then elastically return and are locked to the lock receiving portions 32, this is not essential, and any mode of locking may be employed as long as the locking portions and the lock receiving portions can be locked to each other by the pressing operation. For example, the locking portions may be locked by being pressed into the lock receiving portions.

Although covers 40 of three types are illustrated in the above-described embodiment, this is not essential, and the types of the covers and the shapes of the covers may be freely changed.

Although one first cover 40F, two second covers 40S, and three third covers 40T are fixed to the plate 30 in the above-described embodiment, this is not essential, and the types, the number, and the positions of the covers may be freely changed according to the mode in which the wire harness is to be mounted. For example, it is possible to change the number of third covers according to the number of electrical wire side connectors, to change the positions of the third covers according to the positions of the solenoid valves, and to change the number and the positions of the first cover and the second cover according to the mode in which the wire harness branches, as appropriate.

Although the above-described embodiment describes a case in which the device 10 is a control unit for an automatic transmission, this is not essential, and the present invention is applicable to a wiring unit that is to be attached to another device.

Although the above-described embodiment illustrates a case in which covers 40 of three types are fixed to the plate 30, this is not essential. For example, covers of only one type may be fixed to the plate.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

U: Wiring Unit
10: Device (Automatic Transmission)
20: Wire Harness
22: Electrical Wire Side Connector (Connector)
30: Plate
32: Lock Receiving Portion
40: Cover
43: Locking Portion
52: Connector Holding Portion
53: Edge Cover Portion

The invention claimed is:

1. A wire harness attachment structure comprising:
a plate on which a wire harness is to be mounted, the plate includes a plurality of bolt insertion holes and a plurality of lock receiving portions, the bolt insertion holes penetrate through the plate so that the plate can be bolted to a device; and
a plurality of covers that protect different portions of the wire harness, the covers include locking portions;
the locking portions provided on the covers are configured to be orientated to face, and to be inserted into, the lock receiving portions provided on the plate, and thus the locking portions are locked to the lock receiving portions, and the covers are fixed to the plate;
the plurality of covers include: a first cover that has an I shape in plan view and is provided for a straight portion of the wire harness, a second cover that has an L shape in plan view and is provided for a bent portion or a branching portion of the wire harness, and a third cover that is provided with an edge cover portion that protrudes toward the plate, extends along an end edge of the plate, and covers the end edge of the plate.

2. The wire harness attachment structure according to claim 1,
wherein the lock receiving portion of the plate is provided in a plurality, and any covers that are selected out of the plurality of covers as appropriate can be fixed to the plate.

3. The wire harness attachment structure according to claim 1,
wherein the third cover is provided with a connector holding portion that holds a connector that is provided for the wire harness.

4. A wiring unit comprising:
a wire harness that is mounted on the plate; and
the wire harness attachment structure according to claim 1.

5. The wiring unit according to claim 4 that is to be attached to an automatic transmission.

* * * * *